US011370390B2

(12) United States Patent
Fischer et al.

(10) Patent No.: US 11,370,390 B2
(45) Date of Patent: Jun. 28, 2022

(54) BELT TIGHTENER WITH A MASS BODY

(71) Applicant: Autoliv Development AB, Vargarda (SE)

(72) Inventors: Christian Fischer, Hamburg (DE); Martin Schmidt, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 119 days.

(21) Appl. No.: 16/765,571

(22) PCT Filed: Nov. 15, 2018

(86) PCT No.: PCT/EP2018/081328
§ 371 (c)(1),
(2) Date: May 20, 2020

(87) PCT Pub. No.: WO2019/101615
PCT Pub. Date: May 31, 2019

(65) Prior Publication Data
US 2020/0307510 A1 Oct. 1, 2020

(30) Foreign Application Priority Data
Nov. 24, 2017 (DE) .......................... 102017221028.1

(51) Int. Cl.
*B60R 22/46* (2006.01)
(52) U.S. Cl.
CPC .. *B60R 22/4628* (2013.01); *B60R 2022/4642* (2013.01)
(58) Field of Classification Search
CPC ................ B60R 22/46; B60R 22/4628; B60R 2022/4642
See application file for complete search history.

(56) References Cited

U.S. PATENT DOCUMENTS 4,674,700 A 6/1987 Andersson
6,446,897 B1 * 9/2002 Arima ................ B60R 22/4628
242/374
(Continued)

FOREIGN PATENT DOCUMENTS

DE 10 2007 040254 A1 2/2009
DE 10 2009 039533 A1 3/2011
(Continued)

OTHER PUBLICATIONS

International Search Report of the International Searching Authority for PCT/EP2018/081328 dated Dec. 19, 2018.
(Continued)

*Primary Examiner* — Sang K Kim
(74) *Attorney, Agent, or Firm* — Dickinson Wright PLLC

(57) ABSTRACT

The invention relates to a belt tightener (1) with a mass body drive for a seat belt of a motor vehicle with a force-limiting device with—a belt shaft (3) mounted rotatably in at least one opening (15) of a housing (14) that can be fastened fixedly to the vehicle, it being possible to wind up the seat belt on said shaft, —a tightener drive wheel (24) connected non-rotatably to the belt shaft (3) and having recesses (14) distributed at regular intervals over the circumference, —a chain forming the mass body drive made of loose mass bodies (19), which are guided in a tightener tube (10) and can be driven by pressure application of the tightener tube (10), wherein—the belt shaft (3) can be driven in the winding direction of the seat belt by engagement of the driven mass bodies (19) in the recesses (14) of the tightener drive wheel (24), wherein—the mounting of the belt shaft (3) in the opening (15) of the housing (14) is designed to be flexible in the radial direction.

9 Claims, 5 Drawing Sheets

(56) References Cited

U.S. PATENT DOCUMENTS

Figure 1:
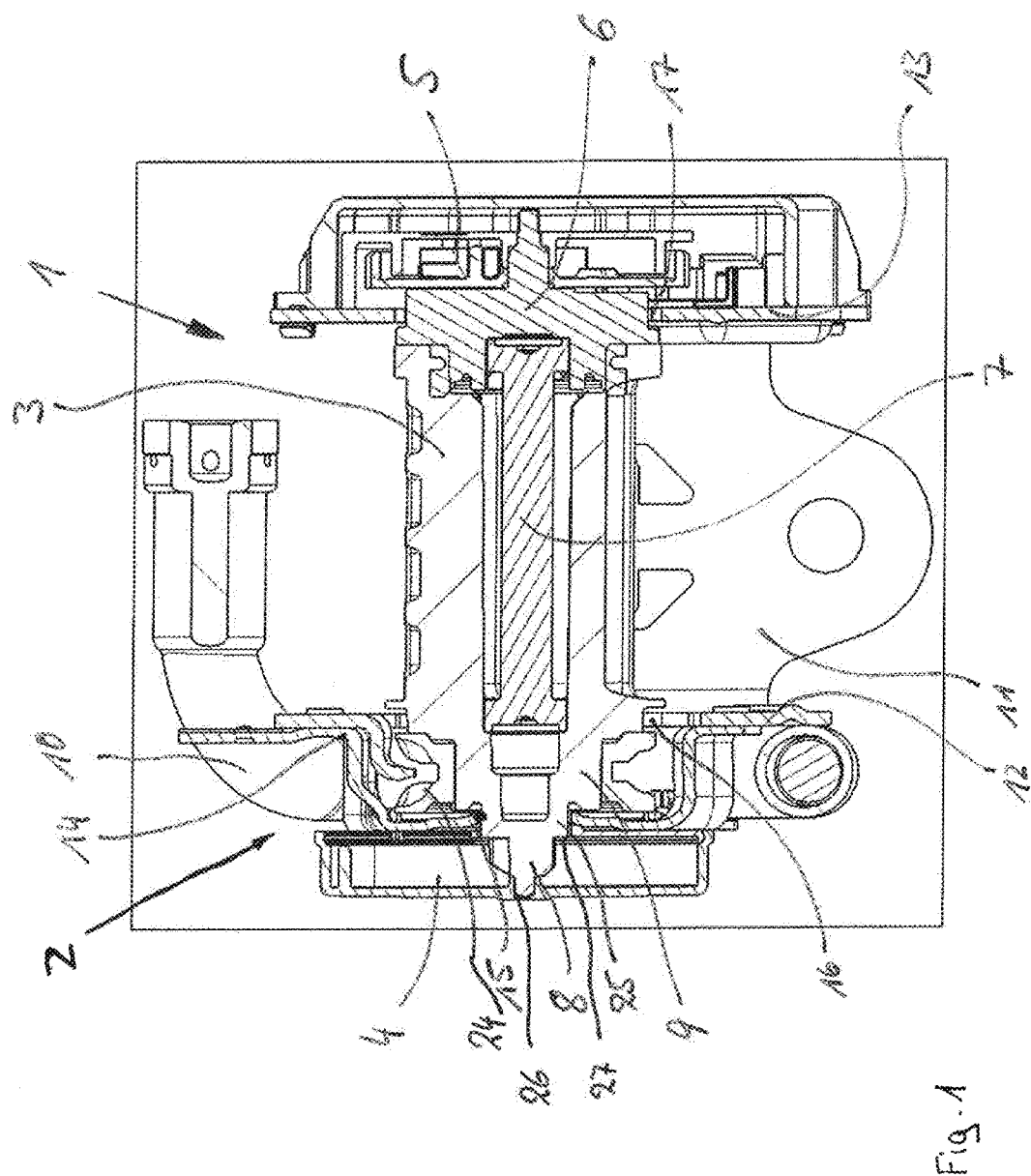

| | | | |
|---|---|---|---|
| 6,446,899 B1* | 9/2002 | Smithson | B60R 22/36 242/379.1 |
| 6,722,600 B2 | 4/2004 | Hamaue et al. | |
| 2013/0140389 A1* | 6/2013 | Pechhold | B60R 22/4628 242/374 |
| 2019/0232916 A1* | 8/2019 | Wang | B60R 22/4628 |

FOREIGN PATENT DOCUMENTS

| | | |
|---|---|---|
| DE | 10 2011 101964 A1 | 11/2012 |
| JP | 2001 163182 A | 6/2001 |

OTHER PUBLICATIONS

English translation of International Search Report of the International Searching Authority for PCT/EP2018/081328 dated Dec. 19, 2018.

* cited by examiner

BELT TIGHTENER WITH A MASS BODY

The present invention relates to a belt tightener with a mass body drive having the features of the preamble of Claim 1.

A belt tightener of the generic type is known, for example, from DE 196 02 549 A1. The belt tightener has a belt shaft on which a seat belt can be wound. The belt shaft is rotatably mounted in a frame fixable to the vehicle. In this belt tightener, the drive is formed from a chain of loosely adjoining mass bodies which are guided in a tightener tube and can be driven by a pressure which can be generated by a pyrotechnic gas generator. When the gas generator is ignited, the chain of the mass bodies is accelerated and brought into engagement with a tightening drive wheel which is connected non-rotatably to the belt shaft and has recesses that correspond to the shape of the mass bodies. In this embodiment, the recesses are formed by dome-shaped half shells which are separated from one another by radially directed projecting body edges. The mass bodies abut one another as a result of the pressure in the tightener tube in front of the tightening drive wheel and engage as a chain with the tightener drive wheel in that the mass bodies engage in series into the dome-shaped half-shells. When the tightener drive wheel is disengaged, the mass bodies can lose contact with one another, since the counterforce exerted by the tightener drive wheel in front of the tightener drive wheel is absent. After completion of the tightening operation, the direction of movement of the tightener drive wheel is reversed due to the reversal of the movement of the seat belt through the force-limited belt strap extension movement, in which case it is possible for a mass body to be located in a critical position at the exit of the tightener drive wheel where such body is clamped between a body edge separating the half shells and the tightener tube or a wall of the tightener housing during a reverse rotation of the tightener drive wheel and thereby at least briefly blocks the tightener drive wheel and thus also the belt shaft in the belt extension direction. The blocking of the tightener drive wheel and the belt shaft can then lead to an undesired increase in the force limiting level, which results in an unnecessarily high occupant load, particularly at low force limiting levels.

DE 10 2009 039 533 A1 further proposes that a spring element is provided which is arranged in an exit region of the mass bodies from the tightener drive wheel. When emerging from the tightener drive wheel, the mass bodies come to bear one after the other on the spring element, which exerts a force on the respectively adjacent mass body, via which the mass body is moved away from the tightener drive wheel, or is forced back in the direction of a recess of the tightener drive wheel, depending on the position in which the mass body is located on the spring element. On account of the force exerted by the spring element, the mass bodies are actively moved out of the critical region after emerging from the tightener drive wheel. Before the mass bodies enter the critical region, the force exerted by the spring element on the mass bodies acts in the direction of the recess, so that the entry of the mass bodies into the critical region is delayed. In this way, to overcome the force from the spring element, higher forces must act on the mass bodies from the mass bodies pushing from behind, which after overcoming the counterforce of the spring element cause additional acceleration of the mass bodies out of the critical region. For a longer period of time, the mass bodies are thus in a position in which they are immediately received back in one of the recesses during a reverse rotation of the tightener drive wheel or belt shaft.

The object of the invention is to create an alternative belt tightener with a mass body drive, in which the probability of jamming of a mass body and a blocking of the belt shaft caused thereby is at least reduced.

The object is achieved by a belt tightener having the features of Claim 1. Further preferred embodiments of the invention can be found in the dependent claims, the description and the associated figures.

The basic idea of the invention is that the mounting of the belt shaft is designed to be flexible in the opening of the housing in the radial direction. Due to the flexible mounting of the belt shaft, it, together with the tightener drive wheel held non-rotatably thereon, can yield radially in the event that a mass body threatens to become clamped or is clamped and thereby exerts a radial force on the tightener drive wheel and the belt shaft. As a result, the belt shaft together with the tightener drive wheel executes an evasive movement, by means of which the blocked or just about to be blocked mass body is released. The mass body can then either re-enter the recess of the tightener drive wheel or emerge from the tightener drive wheel. The flexibility of the mounting is deliberately designed in such a way that it enables a movement of the belt shaft only at very high radial forces, while for normal radial forces the belt shaft can deliberately not execute any radial movements during the belt tightening and belt strap extension movement in that the mounting can absorb these forces without elastic deformation.

In this case, the flexibility of the mounting along the circumference of the opening can preferably be designed varyingly, so that the belt shaft can yield in preferred directions or is flexibly supported against radial forces acting from preferred directions.

In this case, the flexibility of the mounting is preferably largest in an elastic section of the opening which begins at an angle of at least 90 degrees to an exit point of the mass bodies from the recesses of the tightener drive wheel. The forces during an impending clamping of a mass body are always exerted by such a body at the exit point radially inward on the tightener drive wheel and the belt shaft. The proposed arrangement of the start of the elastic section makes it possible to ensure that the belt shaft can yield in all conceivable load cases when a mass body is clamped or briefly before a mass body is clamped, since due to its arrangement the elastic section always receives at least one vectorial portion of the reaction force and consequently yields to said force on account of its elastic properties.

In this case, it is further proposed that the elastic section ends at an angle of at most 270 degrees to the exit point. As a result of the proposed maximum extent of the elastic section, it can be utilized to a maximum extent, while the mounting in the remaining section with higher rigidity is not unnecessarily weakened with regard to the bearing properties which are simultaneously important during normal use.

The flexibility can be realized in a structurally particularly simple manner by one or more free spaces in an edge section of the opening. Thus, no different materials or special materials have to be provided for realizing the flexibility; the flexibility results solely from the weakening of the material in the region of the edge of the mounting opening, wherein the wall thicknesses reduced by the free spaces make it possible for the wall of the mounting to deflect.

In this case, the flexibility can be formed in a particularly simple manner by a tongue which is arranged on the edge of the opening and gives way in the radial direction and on which the belt shaft bears. The tongue is connected to the housing only on one side and thus gives way particularly noticeably. Furthermore, the direction of flexibility is thereby predetermined particularly distinctly or it is possible to design the direction of flexibility particularly well with regard to the deflection movement to be realized.

In this case, the tongue can preferably have a constant thickness, as a result of which an evasive movement of the belt shaft that is as uniform and continuous as possible is made possible without having to overcome force peaks.

It is further proposed that the housing is formed by a strap cover fastened to a frame of the belt tightener. The housing formed by the tightener cover forms a wall which covers the tightening drive outward. This wall of the tightener cover can then preferably be used as a dimensionally stable bearing point. Since the tightener cover must have a certain strength anyway because of the forces to be absorbed during the tightening process, the cover can preferably additionally be used here for mounting the belt shaft. The tightener cover is fixedly connected to the frame through which the belt tightener is attached to a vehicle, so that the tightener cover can also be considered to be vehicle-fixed when the belt tightener is mounted in the vehicle. If the tightener drive is fastened to an outside of the frame and thus also the tightener cover is fastened to an outside of the frame, this can also provide the spacing of the two bearing points of the belt shaft relative to a previously used mounting of the belt shaft in the limbs of the frame, whereby a more stable mounting can be realized overall.

It is further proposed that the flexibility of the mounting is formed by a recess widening the opening in a preferred direction. Through the recess, the opening in the housing is expanded into an oval, and the belt shaft can execute a radial deflection movement in the direction of the recess. The belt shaft is elastically mounted in further bearing points, which, however, are deliberately destroyed under the acting radial forces in the event of a load of a clamped mass body or of a mass body about to be clamped, so that the belt shaft can yield in the direction of the recess and the mass body is released again. The recess thereby defines in which direction the belt shaft can yield and is preferably arranged at an angle of 60 degrees to 270 degrees to the exit point of the mass bodies from the tightener drive wheel, so that the belt shaft yields due to the vectorial component of the clamping force acting in this direction in each case and releases the mass body.

Here, in combination with the intentionally flexible or destructible mounting of the belt shaft in the further bearing points, the recess creates the possibility of a directed deflection of the belt shaft.

Figure 3:
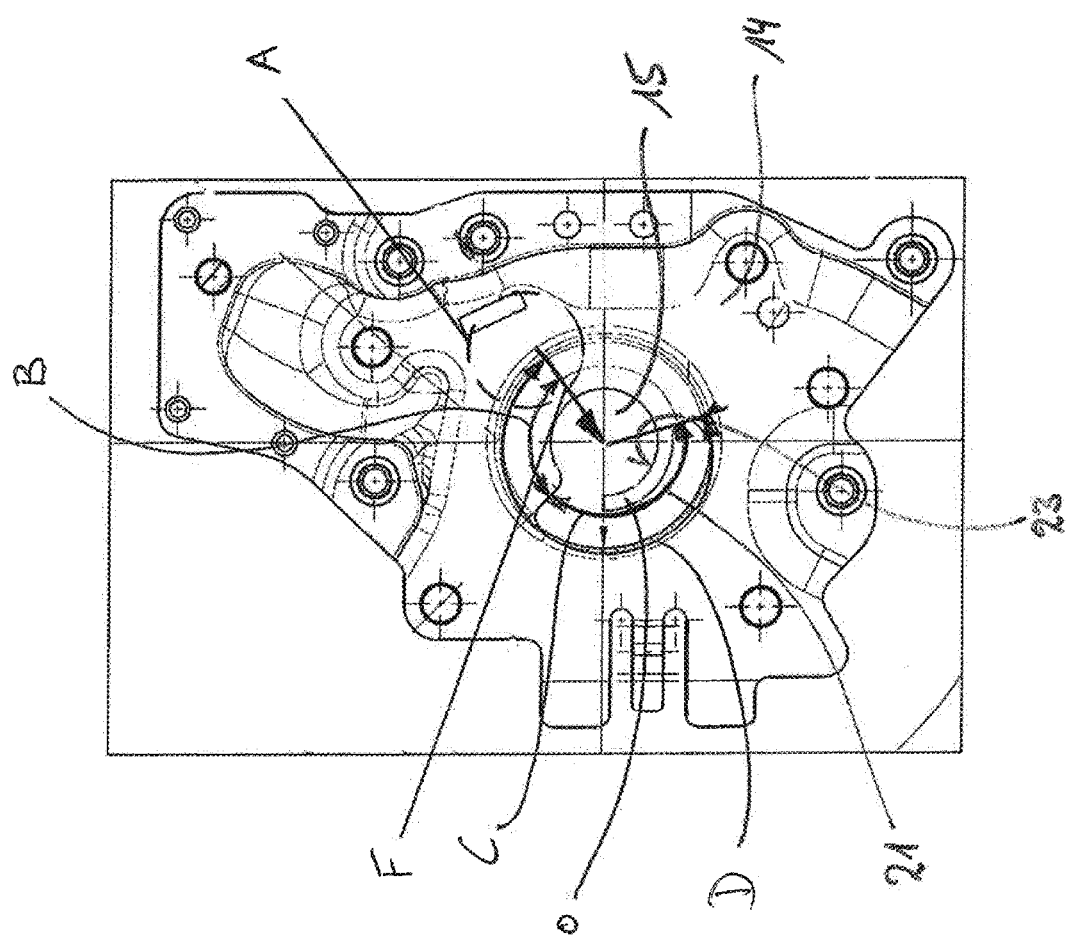
Figure 4:
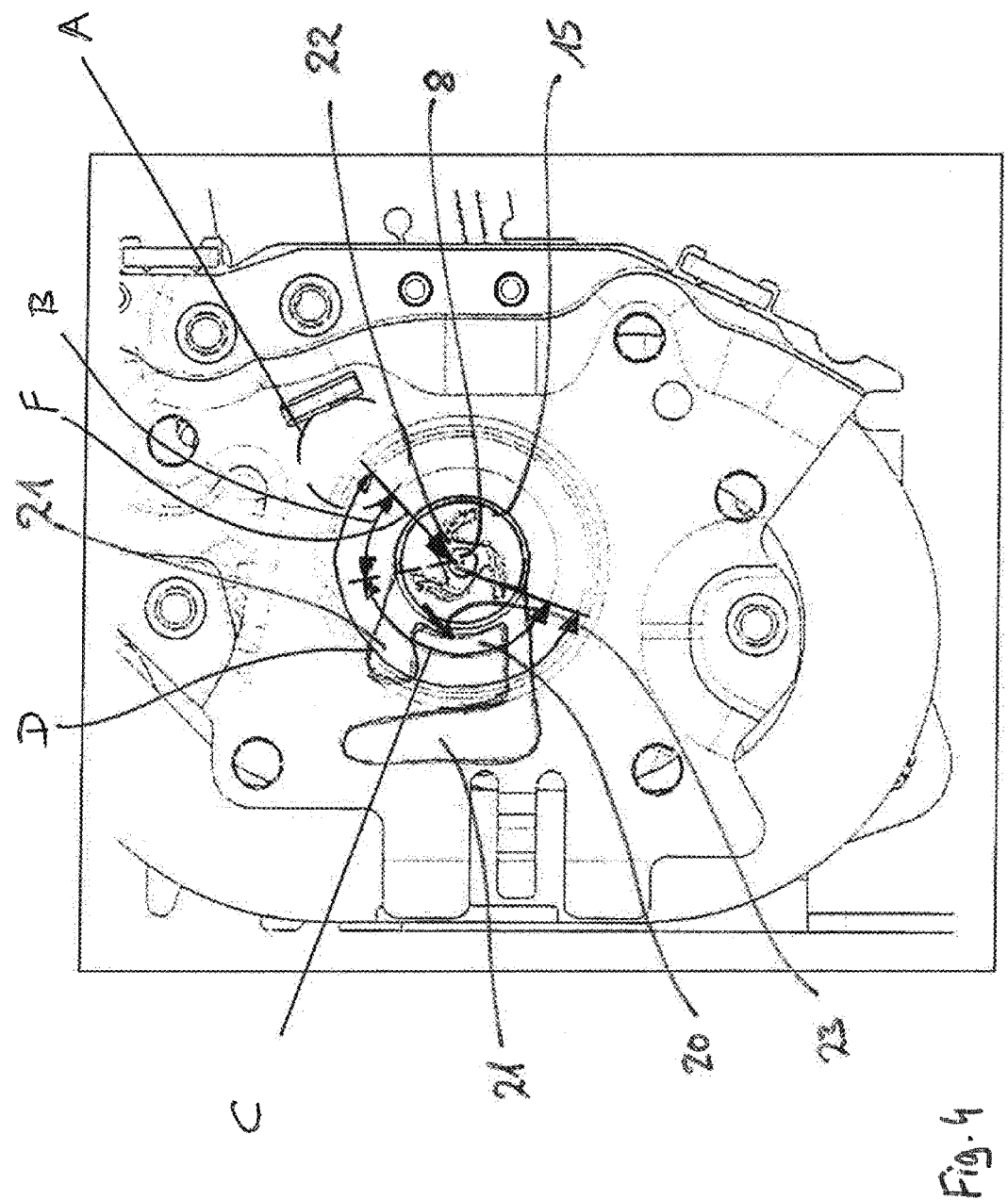
Figure 5:
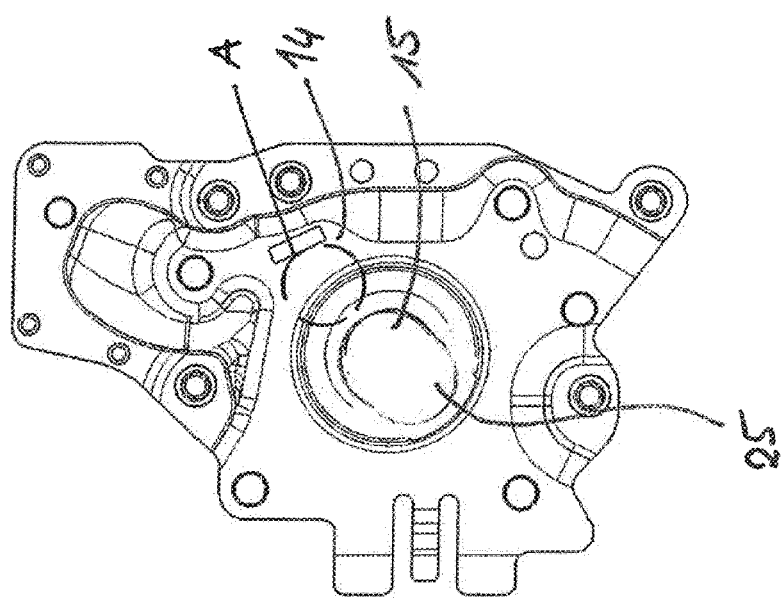

The invention is explained below on the basis of two preferred embodiments with reference to the accompanying figures. These show FIG. 1 is a sectional view of a belt tightener according to the invention, and FIG. 2 is a sectional view of the belt tightener in the sectional direction through the tightener drive, and FIG. 3 is a tightener cover with an opening according to a first embodiment, and FIG. 4 shows a view of one side of a belt tightener with a tightener cover in accordance with a second embodiment, and FIG. 5 shows a view of one side of a housing of the belt tightener according to a third embodiment.

FIG. 1 shows a belt tightener 1 according to the invention with a frame 11 fixable to the vehicle, which frame 11 is U-shaped, with two limbs 12 and 13 projecting from a base plate. A belt shaft 3 is provided in the frame 11 and is connected to a profile head 6 via a torsion bar 7. As a result, the belt shaft 3 together with the profile head 6 forms a rotationally fixed connection up to the plastic deformation limit of the torsion bar 7. The profile head 6 passes through an opening 17 of the right-hand (n the illustration) limb 13 of the frame 11 and can be blocked in the latter by means of a blocking device 5 in a vehicle-fixed manner. Subsequently, the blocked belt shaft 3 can continue to rotate further in the belt strap extension direction only under plastic deformation of the torsion bar 7. The torsion bar 7 functions here as a proven force-limiting device for reducing the occupant load during the restraint of the occupant in an accident.

On the left side of the left (in the illustration) limb 12 of the belt tightener 1, a tightener drive 2 is provided, which drives the belt shaft 3 abruptly in the winding direction during an activation in an early phase of an accident can no longer to be avoided and thereby pulls still existing belt slack out of the seat belt. As a result, the occupant is coupled to the vehicle deceleration earlier, whereby the available forward displacement distance can be increased and the maximum occupant load can be further reduced.

Figure 2:
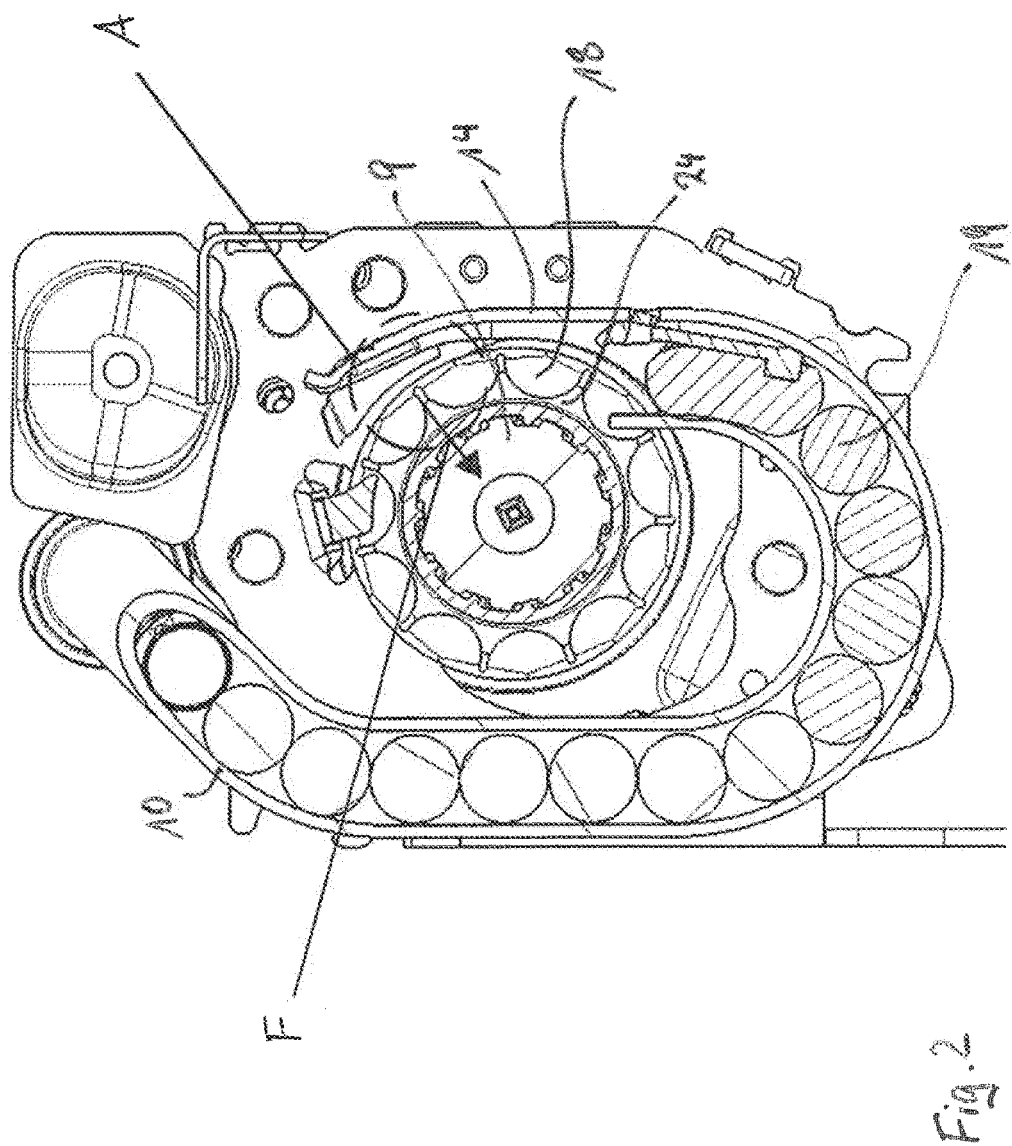

The tightener drive 2 comprises a tightener drive wheel 24 which is also to be seen in FIG. 2 and is held rotationally fixed on a first axial extension 9 of the belt shaft 3 via a toothing system. The tightener drive wheel 24 is provided on its radial outside with a plurality of dome-shaped recesses 18 adjoining each other. Furthermore, a tightener tube 10 is provided with a gas generator fixed in the end of the tightener tube 10 in which a plurality of mutually abutting mass bodies 19 are arranged. The tightener tube 10 is directed tangentially to the tightener drive wheel 24 with the free exit side.

Furthermore, the belt shaft 3 has a second extension 8 which projects from the first extension 9 and has a smaller diameter. The second extension 8 also has three radially projecting spring arms 22 on which an inner spring end, the so-called spring collar, of a drive spring of a spring cassette 4 is clampingly fastened. The drive spring preloads the belt shaft 3 in the winding direction and serves to wind up the seat belt during the belt unbuckling operation or to exert a low retraction force on the seat belt when the occupant is buckled in.

The entire tightener drive 2 is covered toward the outside and fixed by a housing 14 or also tightener housing. In the housing 14 an opening 15 is provided in which the belt shaft 3 is mounted with a cylindrical bearing section 25 arranged between the two extensions 9 and 8.

The tightener drive 2 is activated in that the gas generator is ignited, which thereupon abruptly introduces a very large quantity of gas into a pressure chamber of the tightener tube 10 between the gas generator and the first mass body 19 acting as a piston. The piston drives the mass body chain made of the adjacent mass bodies 19 in the direction of the tightener drive wheel 24 due to the driving gas pressure. As a result, the mass bodies 19 successively come into engagement with the recesses 18 of the tightener drive wheel 24 and thereby drive the tightener drive wheel 24 to rotate counterclockwise in the illustration of FIG. 2. The belt shaft 3 connected non-rotatably to the tightener drive wheel 24 is thereby driven in the winding direction of the seat belt and the seat belt is tightened.

The drive movement is here transmitted in that the mass bodies 19 are driven by the generated gas pressure and are brought into the recesses 18 of the tightener drive wheel 24 in the form of a chain with mutually abutting mass bodies 19. Here, the mass bodies 19 are guided in the tightener tube 10. When exiting the tightener tube 10 and entering the recesses 18, the mass bodies 19 are supported laterally by a wall section of the housing 14 so that they cannot escape laterally on entry into the recesses 18 and during the tightening movement. After the mass bodies 19 have driven the tightener drive wheel 24, the mass bodies 19 exit the recesses 18 of the tightener drive wheel 24 at an exit point A and are discharged into a storage container or a cavity. Since the mass bodies 19 are no longer driven by the gas flow or since the counterforce generated by the tightener drive wheel 24 is absent, they no longer necessarily abut against one another, i.e. they can lose contact with one another in the extreme case and can perform freer movements more easily with respect to one another. In the extreme case, it can thereby happen that a mass body 19 becomes clamped between the wall of the housing 14 or the inner wall of the tightener tube 10 and a tip of a partition wall between two recesses 18 and blocks the tightener drive wheel 24. This is particularly problematic when the belt shaft 3 reverses the direction of rotation through the force-limited belt strap extension movement which follows the tightening movement and a mass body 19 is still present in the exit region of the tightener drive wheel 24, since the discharge movement of the tightener drive wheel 24 is also briefly stopped and reversed in this case. The clamped mass body 19 exerts a radially inwardly directed clamping force F on the tightener drive wheel 24. The possible clamping region or the critical exit point A has approximately a circumferential section of half the diameter of the mass bodies 19 in the case of spherical mass bodies 19.

For this reason, the backward rotational movement of the belt shaft 3 subsequent to the tightening movement can be blocked by an undischarged and blocked mass body 19 during the force-limited belt strap extension movement. Even if the blocked mass body 19 then automatically comes loose again under the acting forces, even a brief blockage of the belt shaft 3 results in at least an increase in the belt force, that is to say a force peak during the force-limited belt strap extension movement with a correspondingly increased occupant load. If the blocked mass body 19 does not come loose automatically, there is even the risk that the force-limited belt strap extension movement will become completely blocked.

In order to reduce the probability of blocking the belt shaft 3, the mounting of the belt shaft 3 in the opening 15 of the housing 14 is deliberately designed to be flexible, so that in this case the belt shaft 3 can yield together with the tightener drive wheel 24. As a result of the yielding movement of the tightener drive wheel 24 and the belt shaft 3, the blocked mass body 19 can automatically come loose again, or the belt shaft 3 can yield together with the tightener drive wheel 24 already in an initial phase of the clamping movement of the mass body 19 so that the latter cannot become clamped in the first place.

Two different embodiments of the invention can be seen in FIGS. 3 and 4 as to how the flexibility in the region of the opening 15 can preferably be formed. The orientation of the belt tightener 1 corresponds to the orientation of the belt tightener 1 in FIG. 2, except that here the housing 24 has been placed so that the opening 15 can be seen. The tightener tube 10 and the tightener drive wheel 24 can thus be mentally added in accordance with FIG. 2.

The flexibility is formed here in each case by one or more free spaces 21 and an elastic tongue 20 in the edge of the opening 15, wherein the tongue 20 in each case has a partially circular radially inner bearing surface 23 with a radius corresponding to the opening 15. The free spaces 21 and the tongue 20 together form an elastic section which allows a targeted, directional yielding of the belt shaft 3 in a preferred direction, while the mounting in the remaining region of the opening 15 is deliberately not designed to be flexible. The bearing surface 23 of the tongue 20 has a radius corresponding to the radius of the opening 15. Furthermore, the tongue is arranged and oriented in such a way that the bearing surface 23 of the tongue 20 and the remaining edge of the opening 15 outside the elastic section form a virtual bearing circle in the cross-section perpendicular to the axis of rotation of the belt shaft 3.

The elastic section, formed by the free spaces 21 and the tongue 20, in which the belt shaft 3 can yield, is arranged and dimensioned such that it starts counterclockwise at an angle B of at least 60 degrees starting from the exit point A of the mass bodies 19 seen in FIG. 2 out of the tightener drive wheel 24. Furthermore, the elastic section extends over a circumferential angle C of not more than 180 degrees, i.e. starting from the exit point A of the mass bodies 19 to an angle of 240 degrees.

In the case of a blocked mass body 19 or a mass body 19 just moving into a blocked position, said mass body exerts a radially inwardly directed clamping force F on the tightener drive wheel 24 and the belt shaft 3, which always has at least one vectorial portion directed in a direction between 60 degrees and 240 degrees to the exit point A of the mass bodies 19. Thus, due to the proposed arrangement of the elastic section, the belt shaft 3 can yield under the acting clamping force F under all conceivable conditions of a blocked mass body 19, and the mass body 19 can in any case automatically come loose again as a result of the yielding movement of the belt shaft 3 or of the tightener drive wheel 24, or the mass body 19 can be prevented from reaching a position blocking the belt shaft 3 by the belt shaft 3 and the tightener drive wheel 24 yielding beforehand.

In FIG. 3, the tongue 20 is formed by a strip having a constant width or thickness with respect to the circumferential direction. The tongue 20 is held at one end at the edge of the opening 15 and extends in the circumferential direction. In this case, the tongue 20 is separated from the remaining material in the edge of the opening 15 by a free space 21 in the form of a bean and can give way, i.e. yield, into the free space 21 due to the fastening at only one end using its elastic properties. The same applies to the embodiment shown in FIG. 4 in which the tongue 20 is in the form of a hook with a bearing surface 23 arranged at the end face. The hook is cut free from the material of the housing 14 on both sides by free spaces 21 and is held at one end on the housing 14. In the case of a clamped mass body 19, the tongue 20 can also spring back, that is to say yield, into the rear free space 21 in this case, whereby the deflection movement of the belt shaft 3 is enabled and the mass body 19 is released again.

FIG. 5 shows the housing 14 in the form of a third embodiment. The opening 15 is expanded diametrically to the exit point A by a recess 25 to form an oval. As can be seen in FIG. 1, the belt shaft 3 is mounted in the bearing points 26 and 27 in bearing openings of the spring cassette 4 which, however, are designed only for very low forces. The spring cassette 4 itself is formed from a plastic housing with a drive spring accommodated therein and is fastened to the housing 14 which in turn is fastened to the frame 11 so that the bearing points 26 and 27 of the spring cassette 4 in the fastened position of the belt tightener 1 form a vehicle-fixed mounting of the belt shaft 3. The housing of the spring cassette has a comparatively thin wall thickness and is made of plastic, so that the belt shaft 3 is deliberately elastically supported within certain limits within the bearing points 26 and 27. If the absorptive bearing forces are exceeded, the mounting in the bearing points 26 and 27 is destroyed and the belt shaft 3 can execute the radial deflection movement in the direction of the recess 25.

The flexibility of the mounting of the belt shaft 3 results from the basically very simple mounting in the bearing points 26 and 27 in conjunction with the deflection possibility created by the recess 25 or also by the elastic section.

The invention claimed is:

1. A belt tightener with a mass body drive for a seat belt of a motor vehicle having a force-limiting device comprising,
   - a belt shaft rotatably mounted in at least one opening of a housing fixable to the vehicle, on which the seat belt can be wound,
   - a tightener drive wheel which is connected non-rotatably to the belt shaft and has recesses which are distributed at regular intervals over the circumference of the tightener drive wheel,
   - a chain of loose mass bodies which form the mass body drive and are guided in a tightener tube and can be driven by pressure application of the tightener tube, wherein
   - the belt shaft can be driven by engagement of the driven mass bodies in the recesses of the tightener drive wheel in the winding direction of the seat belt,
   wherein
   the mounting of the belt shaft in the opening of the housing is structurally flexible in the radial direction.

2. The belt tightener according to claim 1, wherein the flexibility of the mounting along the circumference of the opening to form in an area around the circumference of the opening.

3. The belt tightener according to claim 2, wherein the flexibility of the mounting is largest in an elastic section of the opening which begins at an angle (B) of at least 60 degrees to an exit point of the mass bodies out of the recesses of the tightener drive wheel.

4. The belt tightener according to claim 3, wherein the elastic section ends at an angle (D) of at most 240 degrees to the exit point.

5. The belt tightener according to claim 1, wherein the flexibility is realized by one or more free spaces in an edge section of the opening.

6. The belt tightener according to claim 1, wherein the flexibility is formed by a tongue which is arranged on the edge of the opening and gives way in the radial direction and on which the belt shaft rests.

7. The belt tightener according to claim 6, wherein the tongue has a constant thickness.

8. The belt tightener according to claim 1, wherein the housing is formed by a tightener cover fastened to a frame of the belt tightener.

9. The belt tightener according to claim 1, wherein the flexibility of the mounting is formed by a recess widening the opening in the radial direction.

* * * * *